US011839987B2

(12) United States Patent
Bader et al.

(10) Patent No.: US 11,839,987 B2
(45) Date of Patent: Dec. 12, 2023

(54) VACUUM-BASED END EFFECTOR WITH EXTENDIBLE VACUUM CUP

(71) Applicant: Material Handling Systems, Inc., Mt. Washington, KY (US)

(72) Inventors: Cyril David Bader, Louisville, KY (US); Josiah Douglas, Louisville, KY (US); Paul Receveur, New Albany, IN (US); Jonathan Dean Terrell, Louisville, KY (US)

(73) Assignee: Material Handling Systems, Inc., Mt. Washington, KY (US)

( * ) Notice: Subject to any disclaimer, the term of this patent is extended or adjusted under 35 U.S.C. 154(b) by 315 days.

(21) Appl. No.: 17/118,777

(22) Filed: Dec. 11, 2020

(65) Prior Publication Data

US 2021/0221002 A1    Jul. 22, 2021

Related U.S. Application Data

(60) Provisional application No. 62/962,608, filed on Jan. 17, 2020.

(51) Int. Cl.
*B25J 9/16* (2006.01)
*B25J 15/06* (2006.01)
(Continued)

(52) U.S. Cl.
CPC .............. *B25J 9/1697* (2013.01); *B25J 13/08* (2013.01); *B25J 15/0052* (2013.01);
(Continued)

(58) Field of Classification Search
CPC .... B25J 15/0616; B25J 13/08; B25J 15/0052; B25J 18/02; B25J 18/025
See application file for complete search history.

(56) References Cited

U.S. PATENT DOCUMENTS

| 5,079,903 A | 1/1992 | Hakansson |
| 7,726,715 B2 | 6/2010 | Nagasawa et al. |

(Continued)

FOREIGN PATENT DOCUMENTS

| CN | 201214247 Y | 4/2009 |
| JP | 2016-533988 A | 11/2016 |

(Continued)

OTHER PUBLICATIONS

Korean Intellectual Property Office, International Search Report and Written Opinion issued in corresponding Application No. PCT/US2020/064434, dated Apr. 2, 2021.

*Primary Examiner* — Nicholas Kiswanto
*Assistant Examiner* — Christopher A Buksa
(74) *Attorney, Agent, or Firm* — Stites & Harbison, PLLC; David W. Nagle, Jr.; Gary N. Stewart

(57) ABSTRACT

A vacuum-based end effector for selectively engaging parcels includes a base plate to which a plurality of vacuum cups are mounted and configured to be placed in fluid communication with a vacuum source. Each vacuum cup includes a bellows having a distal end connected to a lip. The vacuum-based end effector further includes a linear actuator that is mounted to the base plate and includes an extendible arm to which at least one vacuum cup is operably connected. The linear actuator can be selectively actuated to extend the extendible arm and move the lip of the vacuum cup operably connected to the extendible arm below a common plane defined by the lips of vacuum cups which maintain a fixed position relative to the base plate to individually address a target parcel. The vacuum-based end effector can be combined with a robot to provide an improved system for selectively engaging parcels.

19 Claims, 11 Drawing Sheets

(51) Int. Cl.
*B25J 15/00* (2006.01)
*B25J 13/08* (2006.01)
*B25J 18/02* (2006.01)
*B07C 3/02* (2006.01)
*B25J 9/12* (2006.01)

(52) U.S. Cl.
CPC ....... *B25J 15/0616* (2013.01); *B25J 15/0683* (2013.01); *B25J 18/02* (2013.01); *B07C 3/02* (2013.01); *B25J 9/123* (2013.01)

(56) References Cited

U.S. PATENT DOCUMENTS

| | | |
|---|---|---|
| 9,457,477 B1 | 10/2016 | Rublee et al. |
| 10,646,898 B2 | 5/2020 | Hillerich, Jr. et al. |
| 10,933,537 B1 * | 3/2021 | Polido .................... B25J 13/081 |
| 10,953,551 B1 * | 3/2021 | Aduh .................... B25J 15/0023 |
| 11,084,175 B2 * | 8/2021 | Polido .................. B25J 15/0061 |
| 11,458,635 B2 * | 10/2022 | Wicks .................... B25J 9/1697 |
| 2016/0136809 A1 | 5/2016 | Subotincic |
| 2017/0291307 A1 | 10/2017 | Davi et al. |
| 2019/0030730 A1 | 1/2019 | Tanaka et al. |
| 2019/0160691 A1 | 5/2019 | O'Connor et al. |
| 2020/0262069 A1 | 8/2020 | Douglas et al. |
| 2020/0262087 A1 | 8/2020 | Douglas et al. |

FOREIGN PATENT DOCUMENTS

| | | |
|---|---|---|
| JP | 2017-056510 A | 3/2017 |
| JP | 2018-089732 A | 6/2018 |
| JP | 2019/005869 A | 1/2019 |
| KR | 10-1078409 B1 | 10/2011 |
| KR | 20-2016-0002650 U | 7/2016 |
| KR | 10-2050894 B1 | 12/2019 |

* cited by examiner

VACUUM-BASED END EFFECTOR WITH EXTENDIBLE VACUUM CUP

CROSS-REFERENCE TO RELATED APPLICATIONS

The present application claims priority to U.S. Patent Application Ser. No. 62/962,608 filed on Jan. 17, 2020, the entire disclosure of which is incorporated herein by reference.

BACKGROUND OF THE INVENTION

The present invention relates to vacuum-based end effectors that are useful for manipulating parcels within a sorting or similar facility. In particular, the present invention relates to a vacuum-based end effector that includes an extendible vacuum cup for selectively engaging parcels.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the various parcels within the facility. One such piece of equipment useful for sorting the various parcels is a robotic arm with an end effector mounted to its distal end that engages parcels that are placed on the conveyers of the systems and transfers the parcels to a target location. In this regard, a number of different end effectors exist in the art, some of which are vacuum-based end effectors utilizing one or more vacuum cups in fluid communication with a vacuum source, which provides sufficient suction for the vacuum cups to engage and transfer parcels. However, in prior art constructions of vacuum-based end effectors, the vacuum cups of the end effector are generally arranged as to move in unison. Further, in prior art constructions, the lip of each vacuum cup (i.e., the lowermost portion of the vacuum cup that engages a parcel during operation) is commonly in the same plane. Thus, during operation, when a certain vacuum cup (or cups) engages a target parcel, other vacuum cups of the end effector may engage a non-target parcel, which can be undesirable. This is particularly problematic in instances where parcels, such as flat envelopes or mailers, become vertically stacked on top of one another.

Accordingly, there remains a need for improvements in vacuum-based end effectors for effectively engaging parcels in a sorting or similar facility.

SUMMARY OF THE INVENTION

The present invention is a vacuum-based end effector that includes an extendible vacuum cup for selectively engaging parcels.

A vacuum-based end effector for selectively engaging parcels includes a base plate to which a plurality of vacuum cups are mounted. Each vacuum cup is configured to be placed in fluid communication with a vacuum source and includes a bellows having a distal end connected to a lip for engaging parcels. The vacuum-based end effector further includes a linear actuator that is mounted to the base plate and includes an extendible arm to which at least one vacuum cup of the plurality of vacuum cups is operably connected. The linear actuator can be selectively actuated to extend or retract the extendible arm to adjust a distance between the vacuum cup(s) operably connected to the extendible arm and the base plate. In this regard, the linear actuator can thus be selectively actuated to vertically extend and direct the vacuum cup(s) operably connected to the extendible arm toward target parcels for engagement therewith.

The vacuum cups of the end effector which are not operably connected to the extendible arm are generally maintained at a fixed position relative to the base plate during operation of the end effector (i.e., they are not vertically extendible), and, as such, the lips thereof may be oriented as to define a common plane. As the extendible arm is extended, the lip of the vacuum cup(s) operably connected to the extendible arm moves below the common plane to individually address a target parcel, thus reducing the risk that other vacuum cups of the end effector will inadvertently engage a non-target parcel. In this way, the vertically extendible vacuum cup is particularly beneficial in instances where the presence of two separate parcels are identified, but it cannot be determined which parcel is positioned at a higher level (i.e., closer to the end effector).

In some embodiments, the vacuum cups which are not operably connected to the extendible arm are directly mounted to the base plate, while the linear actuator is indirectly connected to the base plate. In some embodiments, the base plate defines a plurality of ports, with each port placing a connector configured to be connected to a vacuum source in fluid communication with a vacuum cup. To address parcels of different construction, in some embodiments, the plurality of vacuum cups includes a first set of one or more vacuum cups with lips comprised of a first material and a second set of one or more vacuum cups with lips comprised of a second material. In one such embodiment, the first set of one or more vacuum cups includes lips comprised of a silicone rubber to provide a surface particularly well-suited for engaging parcels including dull or glossy-based materials, while the second set of one or more vacuum cups includes lips comprised of polyurethane well-suited for engaging parcels with flexible packaging materials, such as plastic ("poly") bags.

The vacuum-based end effector of the present invention is configured for mounting to a robot and thus can be combined therewith to provide an improved system for engaging parcels. In this regard, the base plate of the end effector provides a mounting surface to which the robot, or portion thereof, can be connected. In some embodiments, movement of the robot, and thus the vacuum-based end effector, may be regulated by a vision and control subsystem (e.g., by communicating instructions to the robot) using data acquired by a sensor and/or one or more cameras. The one or more cameras of the vision and control subsystem are configured to acquire image data corresponding to the positioning of parcels within a sorting facility (e.g., parcels traveling along a conveyor). The sensor of the vision and control subsystem is configured to acquire data corresponding to the positioning of a parcel, pneumatic engagement of one or more vacuum cups with the parcel, and/or an amount of compression experienced by one or more of the vacuum cups. In some embodiments, the sensor may be comprised of multiple sensors, which can include a photoelectric sensor, an ultrasonic sensor, a vacuum sensor, or combinations thereof.

DETAILED DESCRIPTION OF THE INVENTION

The present invention is a vacuum-based end effector that includes an extendible vacuum cup for selectively engaging parcels.

Figure 1:
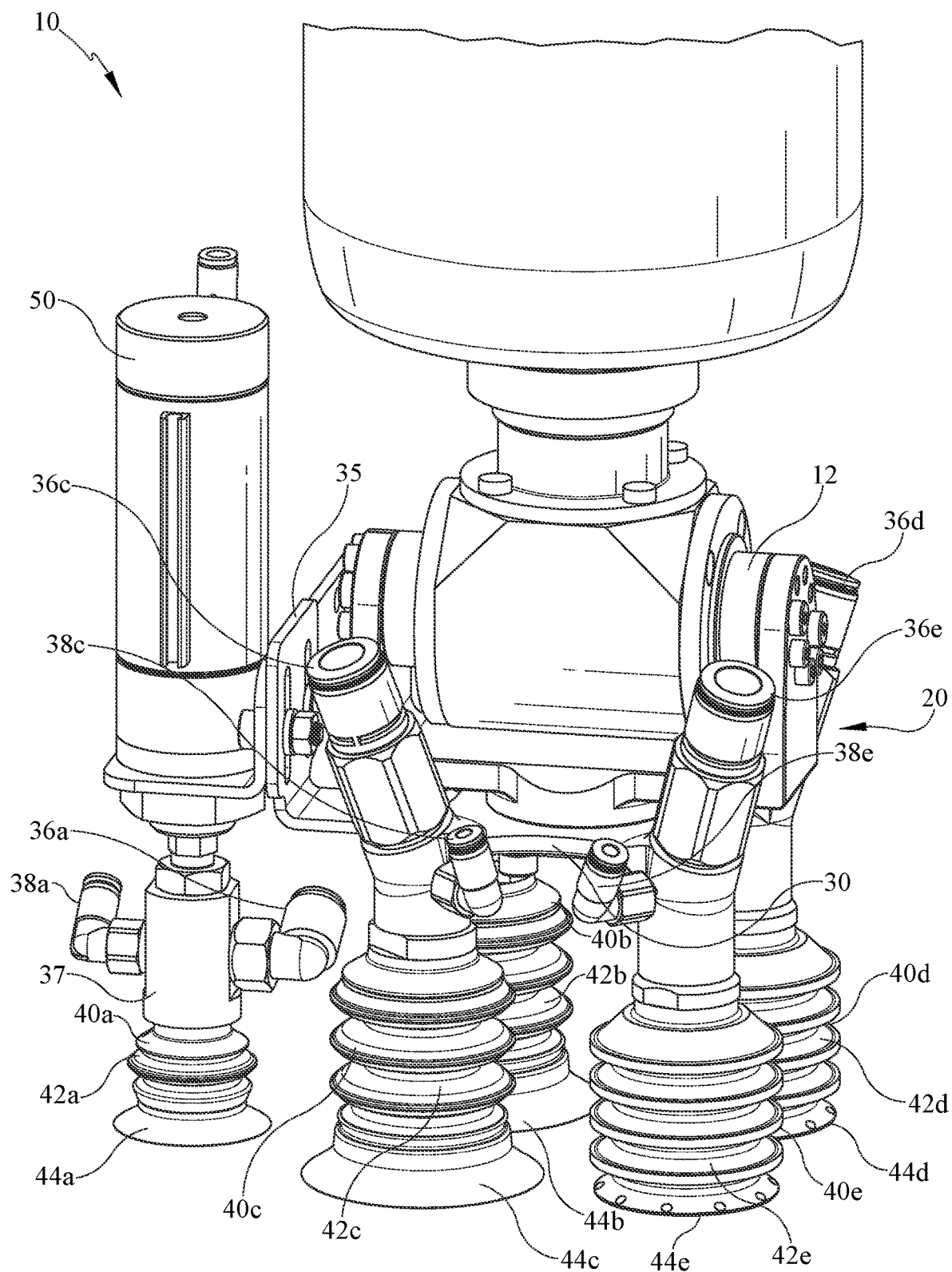
FIG. 1 is a partial perspective view of a system for engaging parcels including an exemplary vacuum-based end effector made in accordance with the present invention.

FIG. 1 is a partial perspective view of a system 10 for engaging parcels (or system 10), which includes an exemplary vacuum-based end effector 20 (or end effector 20) made in accordance with the present invention mounted to a portion of a robot 12. It should be appreciated that the portion of the robot 12 shown in FIG. 1 may be a component, such as a robotic arm, of a larger robot or robotic system, which is configured to move the end effector 20 to selectively engage parcels. For example, the portion of the robot 12 may be a component of a Delta P6 robot manufactured by Schneider Electric and available, for instance, from Advantage Industrial Automation of Duluth, Ga. As further discussed below with reference to FIG. 7, movement of such a robot can be, in some embodiments, regulated based on instructions received from a vision and control subsystem 70.

Figure 2:
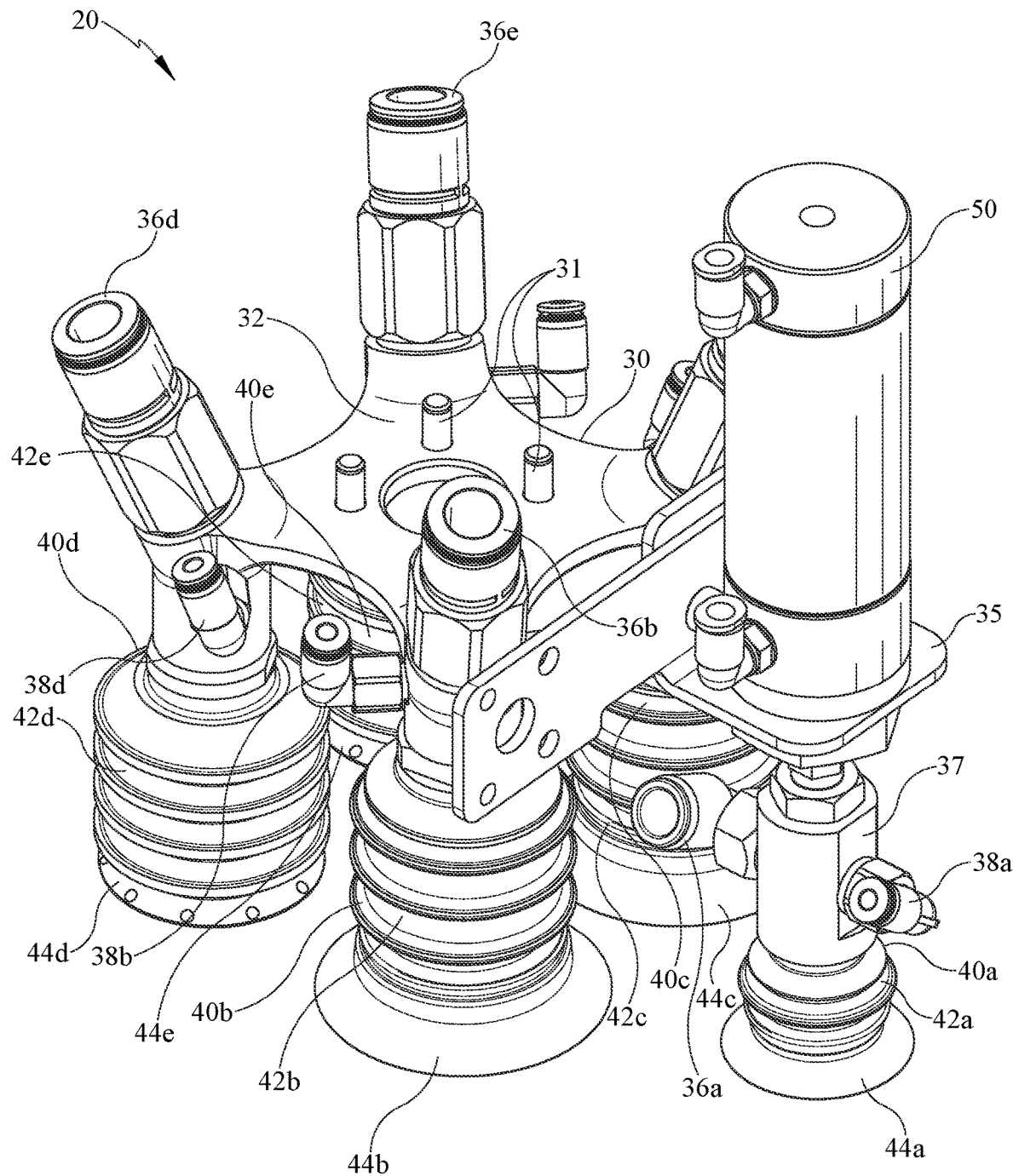
FIG. 2 is a perspective view of the exemplary vacuum-based end effector of the system for engaging parcels of FIG. 1.
Figure 3:
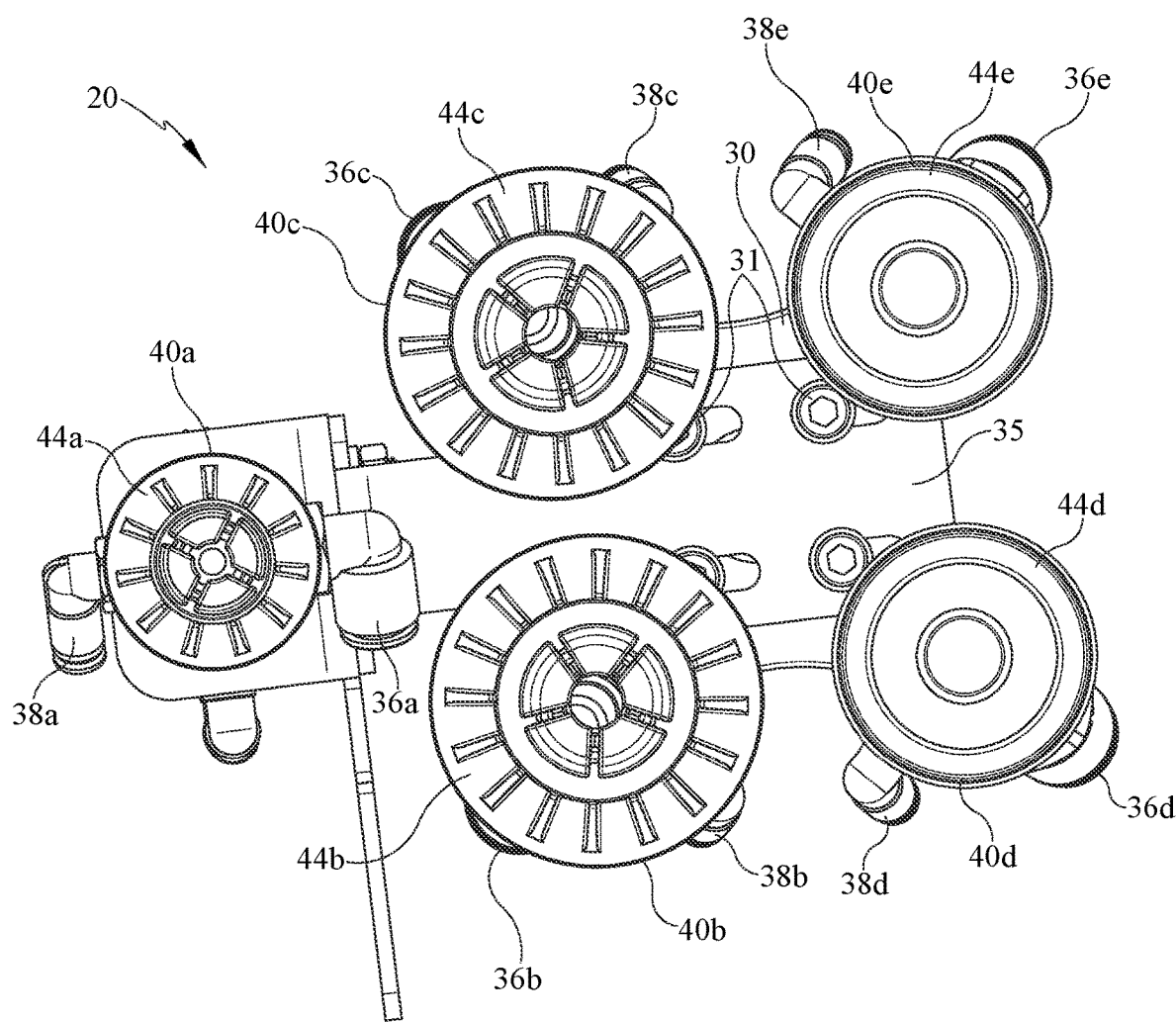
FIG. 3 is a bottom view of the exemplary vacuum-based end effector of the system for engaging parcels of FIG. 1.

FIGS. 2 and 3 are, respectively, a perspective and a bottom view of the exemplary end effector 20.

Figure 4:
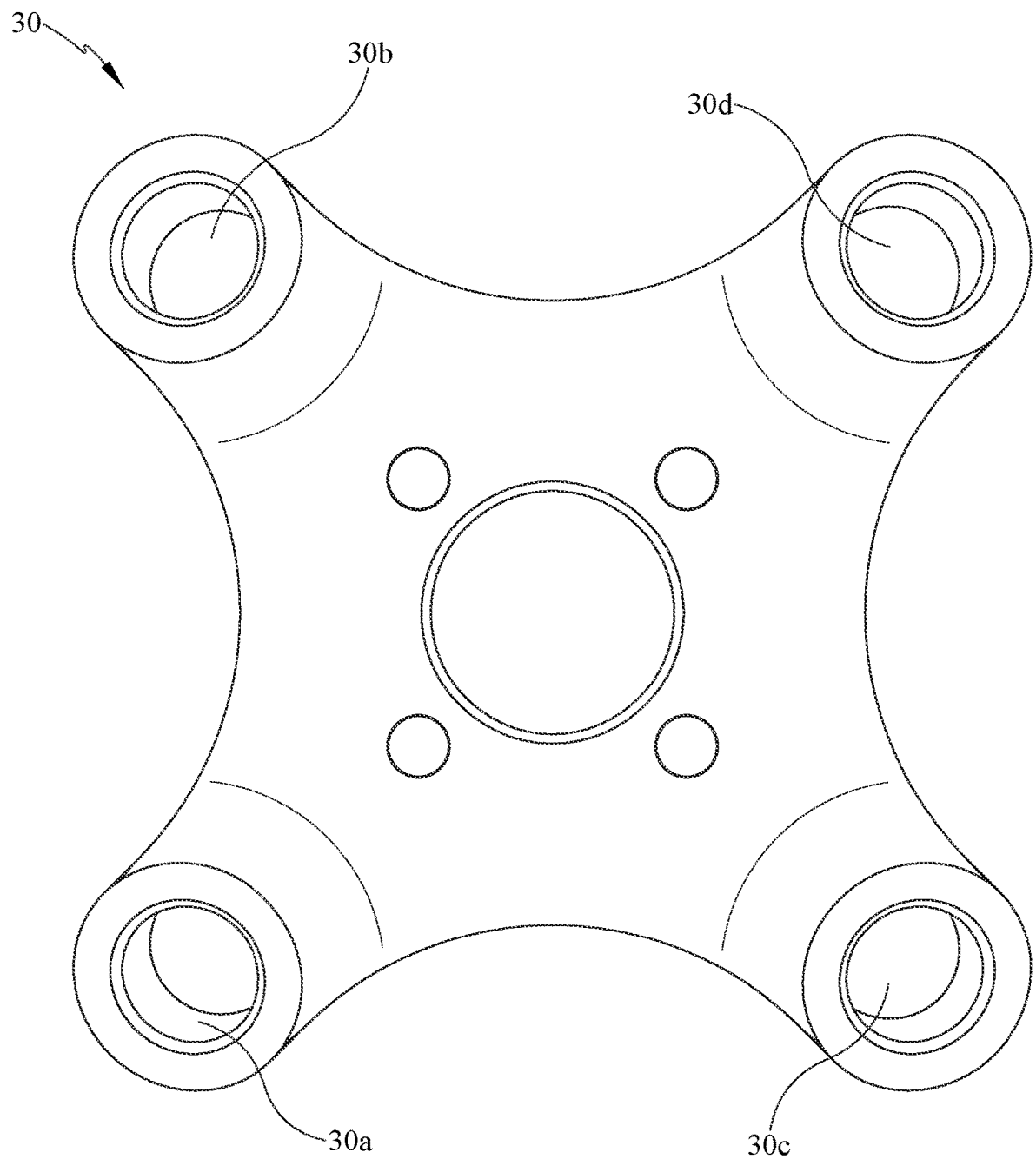
FIG. 4 is a bottom view of a base plate of the exemplary vacuum-based end effector of the system for engaging parcels of FIG. 1.

FIG. 4 is a bottom view of a base plate 30 of the exemplary end effector 20.

FIGS. 5A, 5B, 5C, 5D, and 5E are multiple side views of the system 10 implemented within an area of a sorting facility having a conveyor 80 with parcels 60a, 60b loaded thereon, as further discussed below.

Figure 5A:
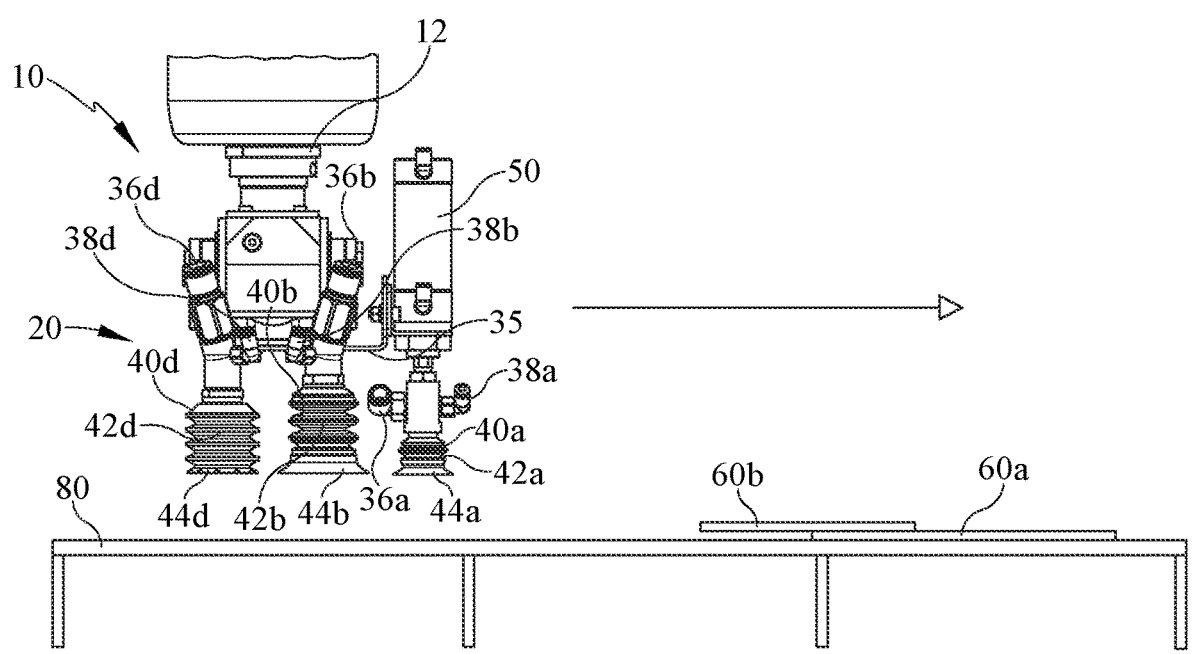
FIG. 5A is a side view of the system for engaging parcels of FIG. 1, implemented within a sorting facility including a conveyor for conveying parcels.
Figure 5B:
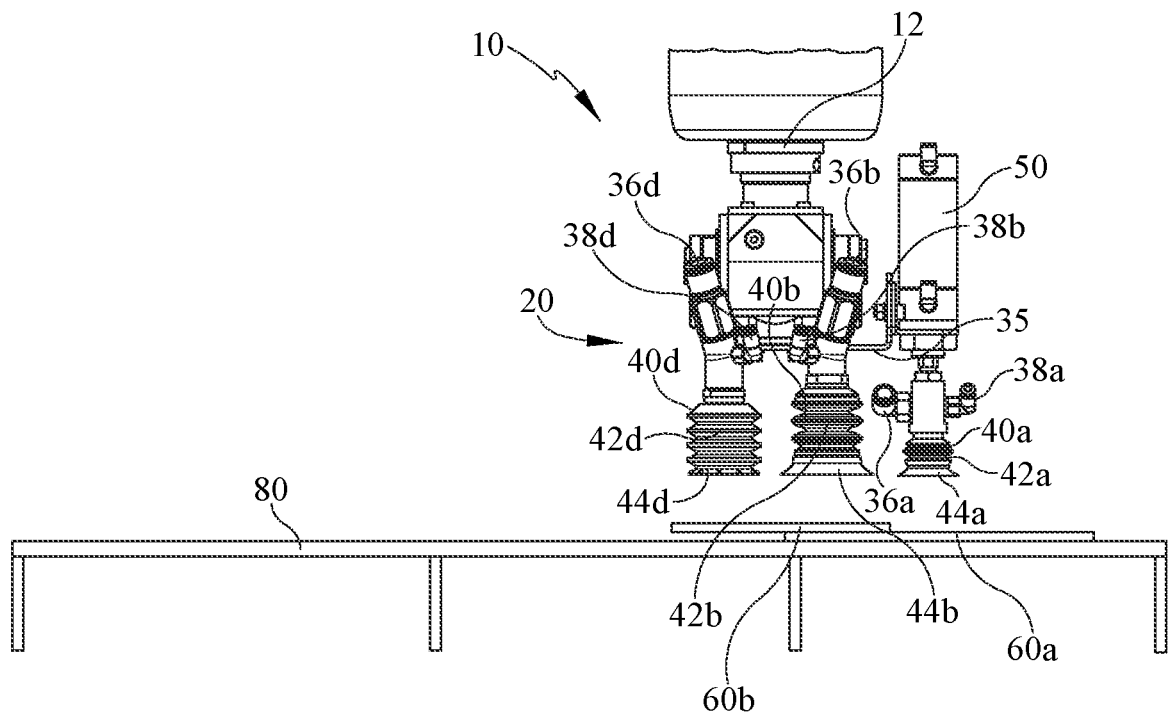
FIG. 5B is another side view of the system for engaging parcels of FIG. 5A.
Figure 5C:
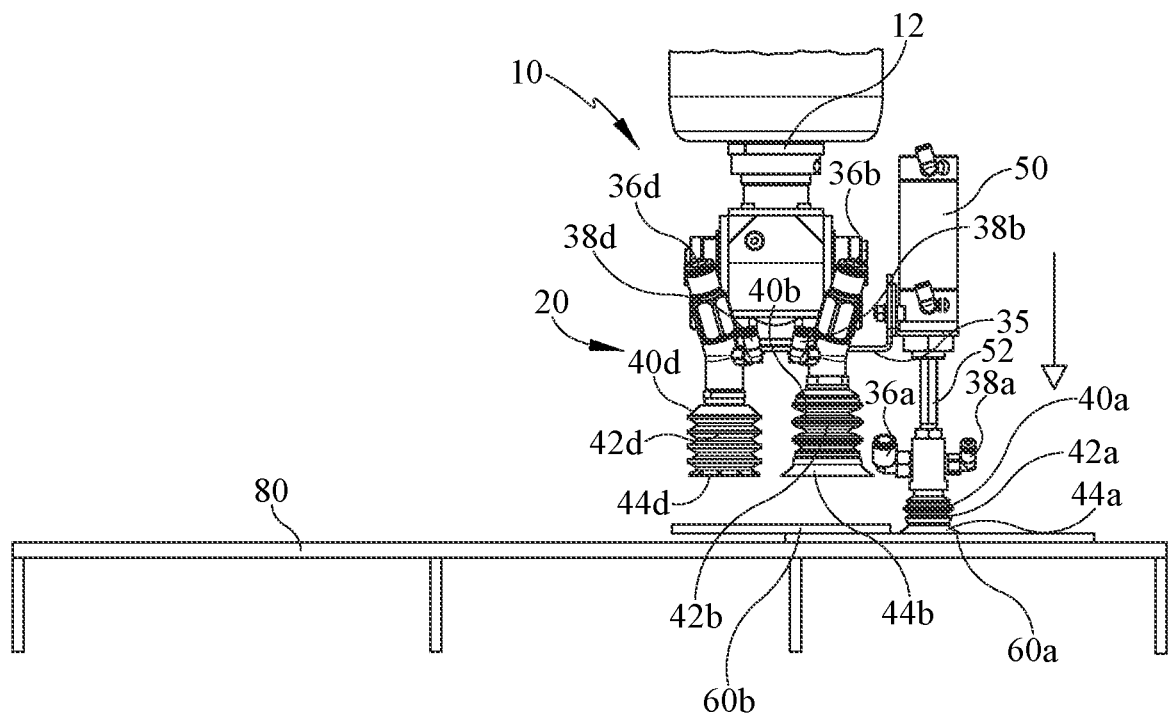
FIG. 5C is another side view of the system for engaging parcels of FIG. 5A.
Figure 5D:
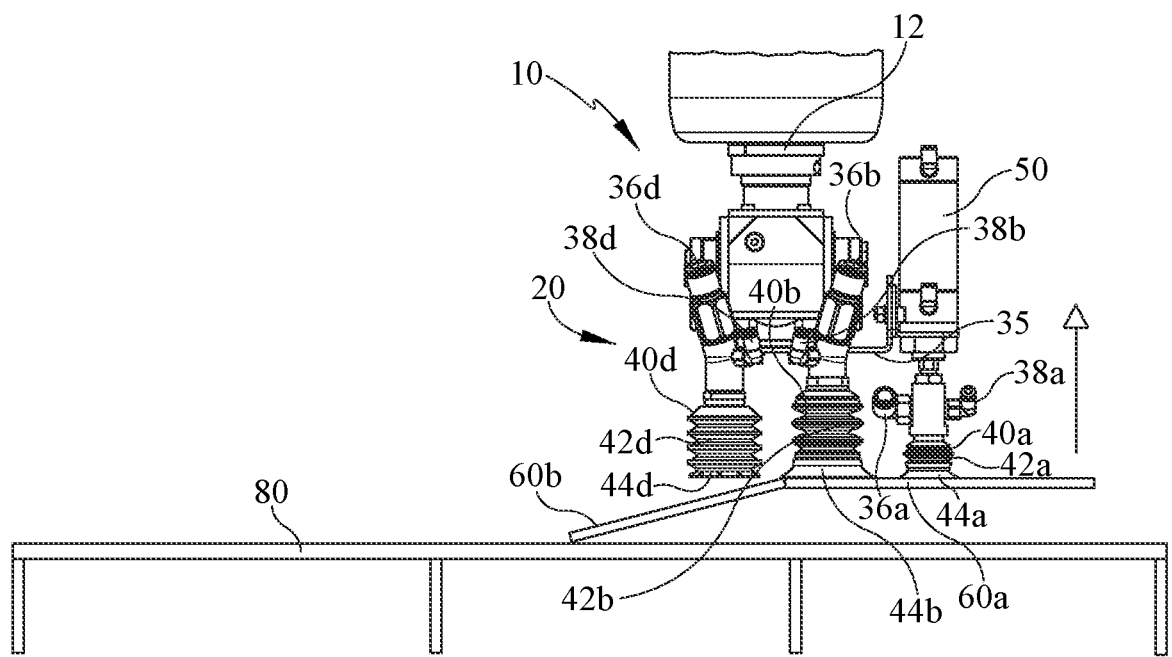
FIG. 5D is another side view of the system for engaging parcels of FIG. 5A.
Figure 5E:
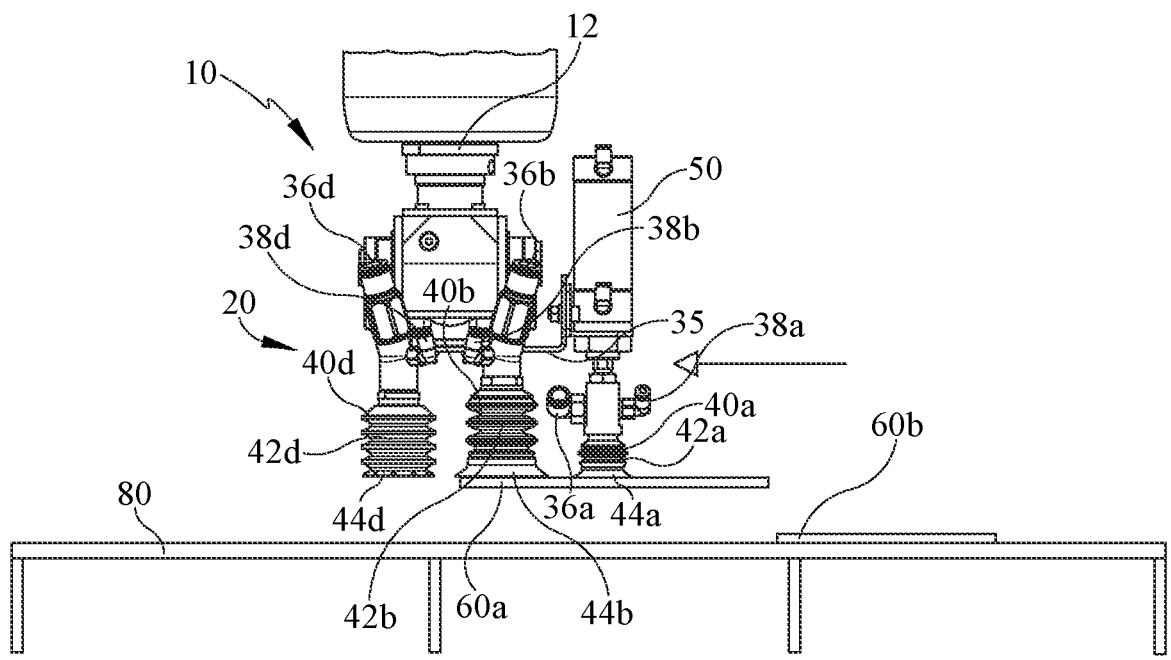
FIG. 5E is another side view of the system for engaging parcels of FIG. 5A.
Figure 6:
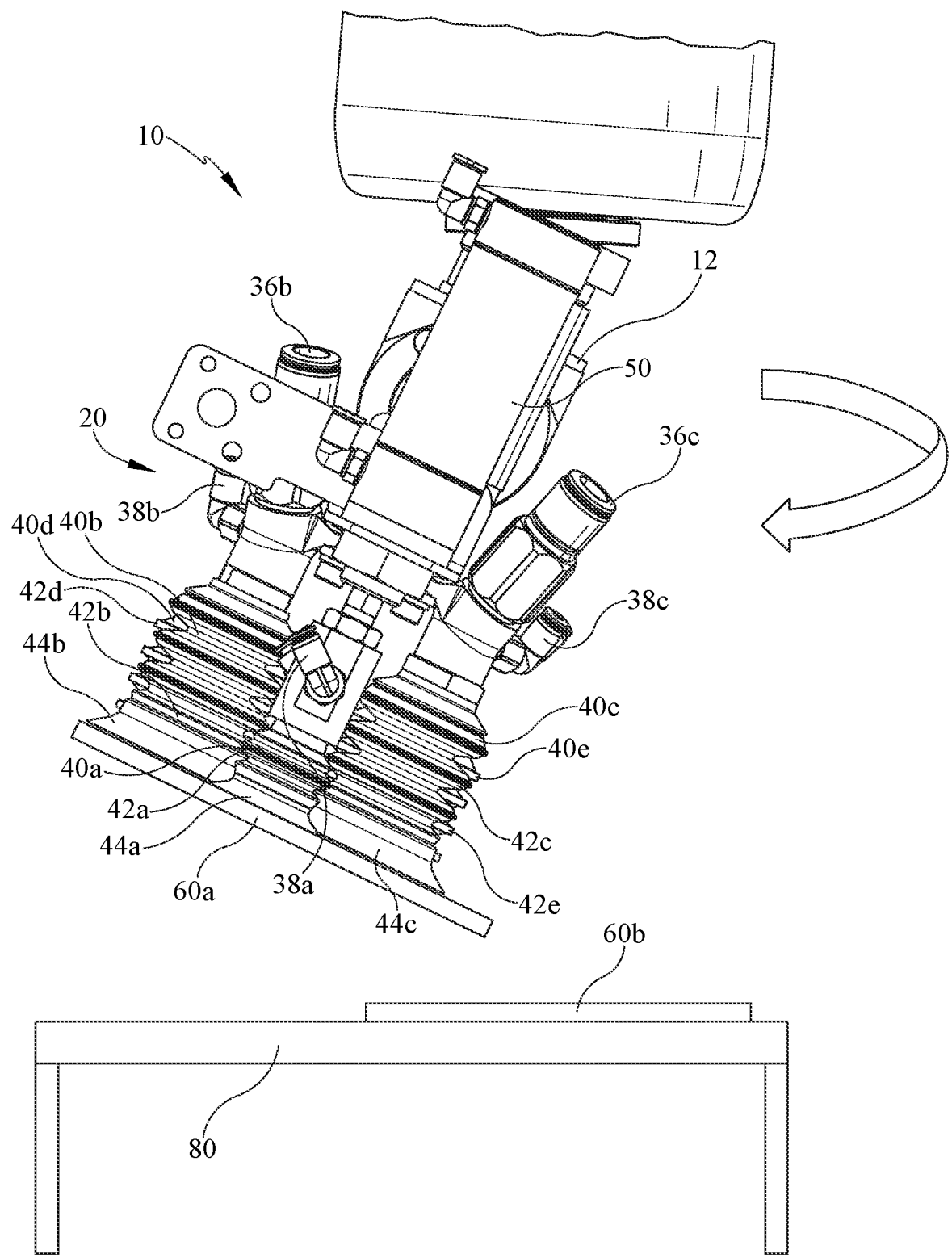
FIG. 6 is a front view of the system for engaging parcels of FIG. 5A.

FIG. 6 is a front view of the system 10 implemented in the same area of the sorting facility as shown in FIGS. 5A, 5B, 5C, 5D, and 5E.

Referring now to FIGS. 1-4, 5A-E, and 6, the end effector 20 includes a plurality of vacuum cups 40a, 40b, 40c, 40d, 40e, which can be connected to, and thus placed in fluid communication with, a vacuum source 90 (FIG. 7) via a vacuum hose (not shown) to provide suction sufficient to engage and lift parcels 60a, 60b moving through a sorting facility, e.g., by way of the conveyor 80. The end effector 20 further includes a base plate 30 to which the plurality of vacuum cups 40a, 40b, 40c, 40d, 40e are mounted, either directly or indirectly.

Referring still to FIGS. 1-4, 5A-E, and 6, in this exemplary embodiment, the end effector 20 includes five vacuum cups 40a, 40b, 40c, 40d, 40e: a first vacuum cup 40a; a second vacuum cup 40b; a third vacuum cup 40c; a fourth vacuum cup 40d; and a fifth vacuum cup 40e. The first vacuum cup 40a is operably connected to a linear actuator 50, which can be selectively actuated to vertically reposition the first vacuum cup 40a relative to the base plate 30, as further described below. In this exemplary embodiment, the linear actuator 50 is mounted to a bracket 35, which, in turn, is connected to the base plate 30. Thus, in this exemplary embodiment, the first vacuum cup 40a is indirectly mounted to the base plate 30. Conversely, in this exemplary embodiment, the second vacuum cup 40b, the third vacuum cup 40c, the fourth vacuum cup 40d, and the fifth vacuum cup 40e are each directly mounted to the base plate 30. An upper surface 32 of the base plate 30 provides the mounting surface to which the robot 12 connects. In this exemplary embodiment, both the robot 12 and the bracket 35 carrying the linear actuator 50 to which the first vacuum cup 40a is operably connected are mounted to the base plate 30 via a plurality of bolts 31, although alternative fasteners may, of course, be used without altering the operation of either the end effector 20 or the system 10 as a whole.

Referring now to FIGS. 1-3, 5A-E, and 6, each vacuum cup 40a, 40b, 40c, 40d, 40e includes a bellows 42a, 42b, 42c, 42d, 42e having a proximal end and a distal end to which a lip 44a, 44b, 44c, 44d, 44e of the vacuum cup 40a, 40b, 40c, 40d, 40e is connected. The bellows 42a, 42b, 42c, 42d, 42e each effectively define a pathway for the flow of air through the respective vacuum cups 40a, 40b, 40c, 40d, 40e.

As best shown in FIG. 3, each lip 44a, 44b, 44c, 44d, 44e comprises an elastomeric material that extends around the distal portion of the bellows 42a, 42b, 42c, 42d, 42e of the respective vacuum cups 40a, 40b, 40c, 40d, 40e. In this exemplary embodiment, the lips 44a, 44b, 44c of the first vacuum cup 40a, the second vacuum cup 40b, and the third vacuum cup 40c are each generally comprised of a silicone rubber, and the lips 44d, 44e of the fourth vacuum cup 40d and the fifth vacuum cup 40e are each generally comprised of polyurethane. In this regard, the end effector 20 thus includes a first set of vacuum cups 40a, 40b, 40c with lips 44a, 44b, 44c comprised of a first material and a second set of vacuum cups 40d, 40e with lips 44d, 44e comprised of a second material, in order to better address parcels 60a, 60b of differing materials or construction. The silicone rubber material of the lips 44a, 44b, 44c of the first vacuum cup 40a, the second vacuum cup 40b, and the third vacuum cup 40c are generally less compliant than the polyurethane material of the lips 44d, 44e of the fourth vacuum cup 40d and the fifth vacuum cup 40e. Without wishing to be bound by any particular theory, it is believed that the silicone rubber lips 44a, 44b, 44c of the first vacuum cup 40a, the second vacuum cup 40b, and the third vacuum cup 40c are particularly useful for engaging parcels made of dull or glossy paper-based materials, such as rigid cardboard and taut plastic (e.g., taut "poly" bag surfaces), as such lips are capable of attaching and forming a seal with those surfaces. Furthermore, and again without wishing to be bound by any particular theory, it is believed that the polyurethane lips 44d, 44e of the fourth vacuum cup 40d and the fifth vacuum cup 40e are particularly useful in engaging parcels in flexible packaging materials, such as plastic ("poly") bags, which may include a wrinkled or non-uniform surface.

Referring still to FIG. 3, in this exemplary embodiment, the polyurethane used for the lips 44d, 44e of the fourth vacuum cup 40d and the fifth vacuum cup 40e is such that a first portion of each lip 44d, 44e proximal to the bellows 42d, 42e exhibits a first durometer and a second portion of each lip 44d, 44e distal to the bellows 42d, 42e exhibits a second durometer, which is softer than the first durometer. More specifically, in this exemplary embodiment, the first portion of the lips 44d, 44e of the fourth vacuum cup 40d and the fifth vacuum cup 40e exhibits a durometer of approximately 50 while the second portion of the lips 44d, 44e exhibits a durometer of approximately 30. Of course, one of skill in the art will readily appreciate that the durometer of the lips 44d, 44e of the fourth vacuum cup 40d and the fifth vacuum cup 40e may be adjusted to better accommodate different parcel types or applications. Indeed, in some embodiments, the durometer may be uniform across the entirety of the lips 44d, 44e of the fourth vacuum cup 40d and the fifth vacuum cup 40e.

One of skill in the art will further appreciate that the type or construction of any particular lip 44a, 44b, 44c, 44d, 44e of the respective vacuum cups 40a, 40b, 40c, 40d, 40e of the end effector 20 may be modified to better accommodate different sorting applications. For example, to better accommodate sorting applications requiring the processing of a high volume of flexible plastic bags, the end effector 20 may be modified so that each lip 44a, 44b, 44c, 44d, 44e is comprised of polyurethane. Conversely, in other sorting applications requiring the processing of a high volume of dull or glossy paper-based materials, the end effector 20 may be modified so that each lip 44a, 44b, 44c, 44d, 44e is comprised of silicone rubber. Furthermore, in alternative embodiments, the lip 44a, 44b, 44c, 44d, 44e of each vacuum cup 40a, 40b, 40c, 40d, 40e may each be, at least partially, comprised of silicone rubber, with one or more of the vacuum cups 40a, 40b, 40c, 40d, 40e further being defined by a foam material (e.g., foam rubber) that is centrally positioned on a bottom surface of the silicone rubber portion of such cups. In this regard, the end effector 20 may thus include, in some embodiments, one or more dual-material vacuum cups, like those disclosed in co-pending and commonly assigned U.S. patent application Ser. No. 16/793,058, which is also incorporated herein by reference.

Referring again to FIGS. 1-3, 5A-E, and 6, the end effector 20 further includes a plurality of connectors 36a, 36b, 36c, 36d, 36e, with each connector 36a, 36b, 36c, 36d, 36e corresponding to a vacuum cup 40a, 40b, 40c, 40d, 40e. In this exemplary embodiment, the end effector 20 includes five connectors 36a, 36b, 36c, 36d, 36e: a first connector 36a corresponding to the first vacuum cup 40a; a second connector 36b corresponding to the second vacuum cup 40b; a third connector 36c corresponding to the third vacuum cup 40c; a fourth connector 36d corresponding to the fourth vacuum cup 40d; and a fifth connector 36e corresponding to the fifth vacuum cup 40e. Of course, depending on the intended application, the number of vacuum cups 40a, 40b, 40c, 40d, 40e and corresponding connectors 36a, 36b, 36c, 36d, 36e may vary. Each connector 36a, 36b, 36c, 36d, 36e is in fluid communication with the bellows 42a, 42b, 42c, 42d, 42e of the respective vacuum cup 40a, 40b, 40c, 40d, 40e to which it corresponds and is configured to connect to the vacuum source 90 (FIG. 7) via a vacuum hose (not shown) to provide suction (i.e., draw air past the lip 44a, 44b, 44c, 44d, 44e and into the bellows 42a, 42b, 42c, 42d, 42e) through the respective vacuum cup 40a, 40b, 40c, 40d, 40e. In this way, the connectors 36a, 36b, 36c, 36d, 36e can be selectively connected to or disconnected from the vacuum source 90 to independently turn on or off, and thus individually address, the vacuum cups 40a, 40b, 40c, 40d, 40e.

Referring now to FIGS. 1-4, 5A-E, and 6, the second connector 36b, the third connector 36c, the fourth connector 36d, and the fifth connector 36e are each in fluid communication with the bellows 42b, 42c, 42d, 42e of the second vacuum cup 40b, the third vacuum cup 40c, the fourth vacuum cup 40d, and the fifth vacuum cup 40e, respectively, via the base plate 30. In this regard, the base plate 30 defines: a first port 30a, which is configured to place the second connector 36b in fluid communication with the bellows 42b of the second vacuum cup 40b; a second port 30b, which is configured to place the third connector 36c in fluid communication with the bellows 42c of the third vacuum cup 40c; a third port 30c, which is configured to place the fourth connector 36d in fluid communication with the bellows 42d of the fourth vacuum cup 40d; and a fourth port 30d, which is configured to place the fifth connector 36e in fluid communication with the bellows 42e of the fifth vacuum cup 40e, as shown best in FIG. 4. Thus, in this exemplary embodiment, the second connector 36b, the third connector 36c, the fourth connector 36d, and the fifth connector 36e are each connected to the second vacuum cup 40b, the third vacuum cup 40c, the fourth vacuum cup 40d, and the fifth vacuum cup 40e via the base plate 30. Conversely, and as perhaps best shown in FIGS. 1 and 2, in this exemplary embodiment, the first connector 36a is connected to the bellows 42a of the first vacuum cup 40a via an adapter 37 connected to an extendible arm 52 (FIG. 5C) of the linear actuator 50.

As evidenced by viewing FIGS. 5B and 5C in sequence, the first vacuum cup 40a is vertically extendible relative to the base plate 30, such that the distance between the lip 44a of the first vacuum cup 40a and the base plate 30 can be increased or decreased. The proximal ends of the respective bellows 42b, 42c, 42d, 42e of the second vacuum cup 40b, the third vacuum cup 40c, the fourth vacuum cup 40d, and the fifth vacuum cup 40e on the other hand are each mounted directly to the base plate 30, as perhaps best shown in FIGS. 1 and 2. In this regard, the second vacuum cup 40b, the third vacuum cup 40c, the fourth vacuum cup 40d, and the fifth vacuum cup 40e each maintain a fixed position relative to the base plate 30 during operation of the end effector 20. Of course, although only the first vacuum cup 40a is operably connected to the linear actuator 50 and thus vertically extendible relative to the base plate 30, it is appreciated that, in alternative embodiments, more than one vacuum cup could be operably connected to the linear actuator 50 and configured for such vertical extendibility relative to the base plate 30 without departing from the spirit or the scope of the present invention.

Referring now to FIGS. 1, 2, 5A-E, and 6, the linear actuator 50 is connected and configured to vertically reposition the first vacuum cup 40a relative to the base plate 30. As noted above, in this exemplary embodiment, the linear actuator 50 is mounted to the bracket 35 which, in turn, is mounted to the base plate 30. Thus, in this exemplary embodiment, the linear actuator 50 is indirectly mounted to the base plate 30. As best shown in FIG. 5C, the linear actuator 50 includes an extendible arm 52 to which the first vacuum cup 40a is operably connected, either directly or indirectly, such that the extendible arm 52 can be extended to increase the distance between the lip 44a of the first vacuum cup 40a and the base plate 30 or retracted to decrease the distance between the lip 44a of the first vacuum cup 40a and the base plate 30. Thus, when the connector 36a of the first vacuum cup 40a is connected to the vacuum source 90 (FIG. 7), the first vacuum cup 40a can be lowered to provide suction at a plane below a common plane defined by the lips 44b, 44c, 44d, 44e of the second vacuum cup 40b, the third vacuum cup 40c, the fourth vacuum cup 40d, and the fifth vacuum cup 40e. In this way, the first vacuum cup 40a can thus be extended to engage a target parcel 60a, without risk of the second vacuum cup 40b, the third vacuum cup 40c, the fourth vacuum cup 40d, or the fifth vacuum cup 40e also inadvertently engaging a non-target parcel 60b located proximate to the target parcel 60a.

Figure 7:
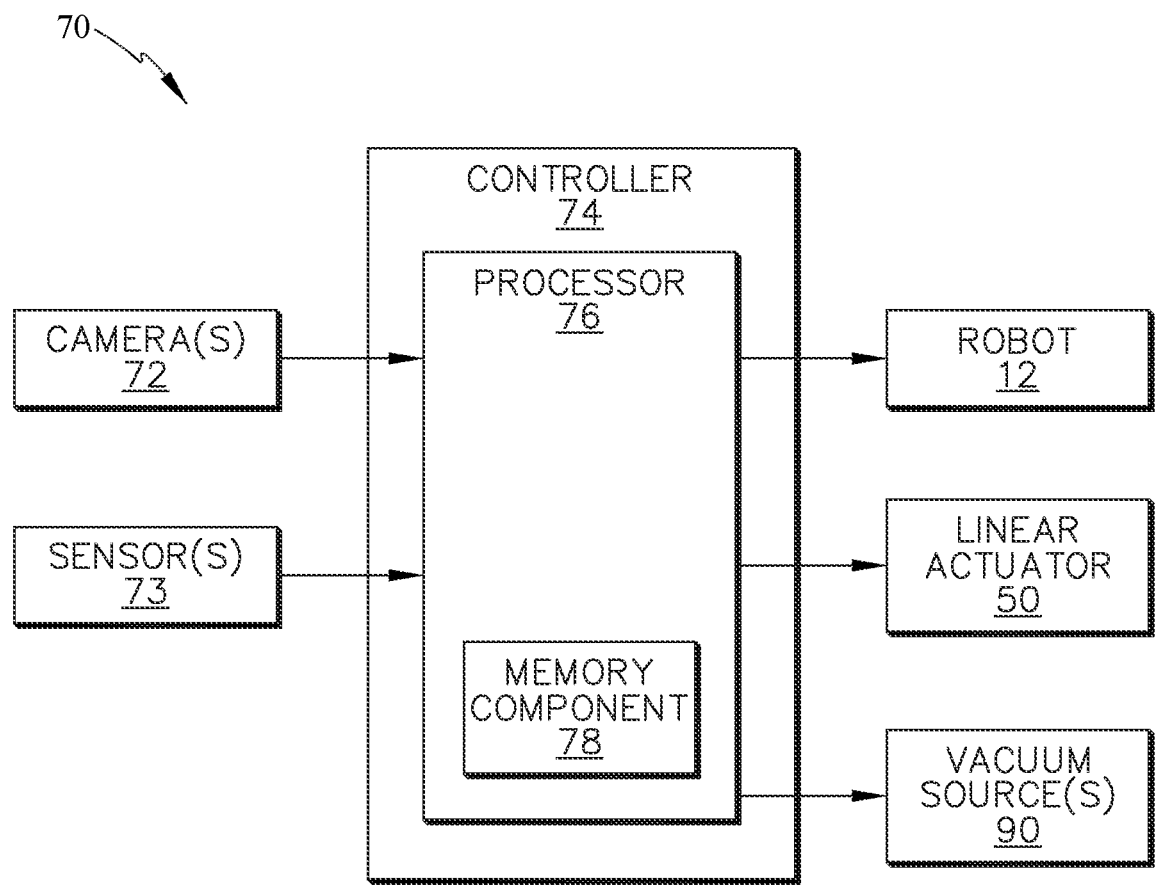
FIG. 7 is a is a schematic diagram of a vision and control subsystem for use with the system for engaging parcels of FIG. 1.

FIG. 7 is a schematic diagram of a vision and control subsystem 70 for use with the system 10 for engaging parcels.

Referring now to FIG. 7, to detect the location of parcels 60a, 60b (as shown in FIGS. 5A-E, and 6) within a facility and regulate movement of the robot 12 and, thus, the end effector 20 mounted thereto, in this exemplary embodiment, the system 10 for engaging parcels includes a vision and control subsystem 70. The vision and control subsystem 70 includes one or more cameras 72, where each camera 72 is configured to acquire two-dimensional and/or three-dimensional image data either on command (for example, in response to an electronic signal or similar trigger) or substantially continuously. Suitable cameras for use in the present invention include three-dimensional image sensors manufactured and distributed by ifm Efector Inc. of Malvern, Pa. Each camera 72 is positioned so that the field of view of each camera 72 includes an area along which a parcel 60a, 60b (as shown in FIGS. 5A-E) may travel as it is transported through the sorting facility.

Referring still to FIG. 7, the vision and control subsystem 70 further includes a controller 74 to which each camera 72 is operably connected, such that image data collected by the one or more cameras 72 is transmitted to the controller 74 for subsequent processing. The controller 74 includes a processor 76 for executing instructions (routines) stored in a memory component 78 or other computer-readable medium. With respect to processing the image data from the one or more cameras 72, the controller 74 analyzes the data received by the camera 72 (or cameras) to identify the position of a target parcel within the sorting facility. For example, FIGS. 5A-E and 6 illustrate a target parcel 60a traveling along a conveyor 80 within the sorting facility. In this exemplary embodiment, to provide feedback to the controller 74 regarding the position of the target parcel 60a within the facility and/or vacuum cup engagement with the target parcel 60a, the vision and control subsystem 70 furthers include one or more sensors 73 (as further described below) operably connected to the controller 74.

Referring now to FIGS. 5A, 5B, and 7, upon identifying the target parcel 60a, the controller 74 communicates instructions to the robot 12 (or various motors and/or actuators associated therewith) to move towards the target parcel 60a so that the extendible first vacuum cup 40a is positioned over the target parcel 60a. In this regard, the controller 74 is thus operably connected to the robot 12. The controller 74 may be operably connected to the robot 12 directly or indirectly, such as through a motor control subsystem (not shown) associated with the robot 12 like that described in U.S. Pat. No. 10,646,898, which is also incorporated herein by reference. To assist the controller 74 in identifying when the first vacuum cup 40a is positioned over the target parcel 60a, in some embodiments, the one or more sensors 73 can include a photoelectric sensor, which is attached to the end effector 20 and provides feedback to the controller 74 to alert the controller 74 when the target parcel 60a is in close proximity to the first vacuum cup 40a. Alternatively, the controller 74 may rely exclusively on image data collected by the one or more cameras 72.

Referring now to FIGS. 5C and 7, upon determining the first vacuum cup 40a is positioned over the target parcel 60a, the controller 74 communicates instructions to the linear actuator 50 to extend the extendible arm 52, thereby directing the first vacuum cup 40a towards the target parcel 60a, causing the lip 44a of the first vacuum cup 40a to engage the target parcel 60a. In this regard, the controller 74 is also operably connected to the linear actuator 50. At this point, the vertical separation existing between the extendible first vacuum cup 40a and the remaining stationary vacuum cups 40b, 40c, 40d, 40e prevents the non-target parcel 60b from being inadvertently engaged by the stationary vacuum cups 40b, 40c, 40d, 40e (i.e., those vacuum cups maintaining a fixed position relative to the base plate 30). In this way, the extendible first vacuum cup 40a is particularly beneficial in instances where the vision and control subsystem 70 can identify the presence of two separate parcels 60a, 60b, but cannot determine which parcel 60a, 60b is positioned at a higher level (i.e., closer to the end effector 20).

Referring still to FIGS. 5C and 7, in this exemplary embodiment, compressed air is utilized to extend the extendible arm 52. Accordingly, in some embodiments, the linear actuator 50 may include a vacuum ejector (not shown), which is configured to be placed in fluid communication with a compressed air source (not shown), and which may be used to provide the first vacuum cup 40a with a dedicated vacuum source, which is separate from one or more vacuum sources providing suction to the second vacuum cup 40b, the third vacuum cup 40c, the fourth vacuum cup 40d, and the fifth vacuum cup 40e. In alternative embodiments, however, a single vacuum source may be shared by the first vacuum cup 40a, the second vacuum cup 40b, the third vacuum cup 40c, the fourth vacuum cup 40d, and the fifth vacuum cup 40e. In this regard, the vacuum source 90 illustrated in FIG. 7 may thus be comprised of a single vacuum source or multiple vacuum sources.

Referring still to FIGS. 5C and 7, to assist the controller 74 in determining whether the lip 44a of the first vacuum cup 40a is sufficiently engaged with the target parcel 60a, in some embodiments, the one or more sensors 73 includes a vacuum sensor. The vacuum sensor is attached to the end effector 20 and provides feedback to the controller 74 that can be used to determine whether the first vacuum cup 40a is pneumatically engaged with the target parcel 60a. In some embodiments, the end effector 20 may utilize a vacuum sensor corresponding to each vacuum cup 40a, 40b, 40c, 40d, 40e. To this end, and now referring to FIGS. 1-3 and 5A-E, the end effector 20 includes a first sensor port 38a corresponding to the first vacuum cup 40a, a second sensor port 38b corresponding to a second vacuum cup 40b, a third sensor port 38c corresponding to the third vacuum cup 40c, a fourth sensor port 38d corresponding to the fourth vacuum cup 40d, and a fifth sensor port 38e corresponding to the fifth vacuum cup 40e. Each sensor port 38a, 38b, 38c, 38d, 38e is in fluid communication with the vacuum cup 40a, 40b, 40c, 40d, 40e to which it corresponds and is configured to operably connect to a vacuum sensor (not shown in FIGS. 1-3 and 5A-E.)

Referring again to FIG. 7, in some embodiments, the sensor 73 (or sensors) additionally or alternatively include an ultrasonic sensor. The ultrasonic sensor is attached to the end effector 20 and provides feedback to the controller 74 regarding the amount of compression experienced by the bellows 42a of the first vacuum cup 40a that can be used to determine whether the first vacuum cup 40a is pneumatically engaged with the target parcel 60a. In some embodiments, multiple ultrasonic sensors may be attached to the end effector 20 to provide feedback to the controller 74 regarding the amount of compression experienced by the bellow s42a, 42b, 42c, 42d, 42e of each vacuum cup 40a, 40b, 40c, 40d, 40e.

Referring still to FIG. 7, in this exemplary embodiment, the vacuum source(s) 90 is operably connected to the controller 74, such that the controller 74 can communicate instructions which activate, deactivate, or otherwise adjust the vacuum source(s) 90 to regulate the suction applied to the vacuum cups 40a, 40b, 40c, 40d, 40e in fluid communication therewith. Accordingly, in instances where the vacuum source 90 is comprised of multiple vacuum sources corresponding to different vacuum cups 40a, 40b, 40c, 40d, 40e, the controller 74 can selectively regulate which vacuum cups 40a, 40b, 40c, 40d, 40e of the end effector 20 are active at a given time. In this regard, activation and deactivation of the vacuum source(s) 90 may be based on feedback provided to the controller 74 from the one or more cameras 72 and/or sensor(s) 73.

Referring now to FIGS. 5D-5E, 6, and 7, upon determining the first vacuum cup 40a is pneumatically engaged with the target parcel 60a, the controller 74 communicates instructions to the linear actuator 50 to retract the extendible arm 52, thereby lifting the target parcel 60a, and/or to the robot 12 (or various motors and/or actuators associated therewith) to move the end effector 20 to the intended destination for the target parcel 60a. In some instances, instructions communicated to the linear actuator 50 may cause the extendible arm 52 to retract the first vacuum cup 40a to the common plane defined by the lips 44b, 44c, 44d, 44e of the second vacuum cup 40b, the third vacuum cup 40c, the fourth vacuum cup 40d, and the fifth vacuum cup 40e. Depending on the positioning of the target parcel 60a in such instances, the suction provided by the second vacuum cup 40b, the third vacuum cup 40c, the fourth vacuum cup 40d, and the fifth vacuum cup 40e may assist the first vacuum cup 40a in lifting the target parcel 60a. As shown in FIGS. 5D-E, in instances where a non-target parcel 60b is stacked on top of a target parcel 60a, retracting the extendible arm 52 and lifting the target parcel 60a upwards, may cause the non-target parcel 60b to fall off of the target parcel 60a. As shown in FIG. 6, the controller 74 can further communicate instructions to the robot 12 (or various motors and/or actuators associated therewith) to tilt the end effector 20 from an upright position to cause the non-target parcel 60b to "slide" off of the target parcel 60a.

The foregoing process can be repeated by the system 10 for engaging parcels to selectively engage and process remaining parcels located on the conveyor 80.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A vacuum-based end effector, comprising:
   a base plate;
   a plurality of vacuum cups mounted to the base plate and configured to be placed in fluid communication with a vacuum source, each vacuum cup of the plurality of vacuum cups including a bellows having a distal end connected to a lip for engaging a parcel; and
   a linear actuator mounted to the base plate and including an extendible arm operably connected to at least one vacuum cup of the plurality of vacuum cups and being configured to extend and retract to adjust a distance between the at least one vacuum cup operably connected to the extendible arm and the base plate;
   wherein the plurality of vacuum cups includes one or more vacuum cups which maintain a fixed position relative to the base plate during operation of the vacuum-based end effector, with the respective lips of the one or more vacuum cups which maintain the fixed position defining a common plane;
   wherein the at least one vacuum cup operably connected to the extendible arm is positioned outside of the one or more vacuum cups which maintain the fixed position relative to the base plate when the lip of the at least one vacuum cup operably connected to the extendible arm is positioned in the common plane; and
   wherein the linear actuator is mounted to the base plate, such that the at least one vacuum cup operably connected to the extendible arm is positioned entirely outside of an area extending below a bottom surface of the base plate during operation of the vacuum-based end effector and is laterally spaced from the one or more vacuum cups which maintain the fixed position relative to the base plate.

2. The vacuum-based end effector as recited in claim 1, wherein the lip of the at least one vacuum cup operably connected to the extendible arm moves out of the common plane as the extendible arm is extended.

3. The vacuum-based end effector as recited in claim 1, and further comprising:
   a plurality of connectors, with each connector of the plurality of connectors being in fluid communication with a vacuum cup of the plurality of vacuum cups and configured to be connected to the vacuum source.

4. The vacuum-based end effector as recited in claim 3, wherein the base plate defines a plurality of ports, each port of the plurality of ports placing a connector of the plurality of connectors in fluid communication with a vacuum cup of the plurality of vacuum cups.

5. The vacuum-based end effector as recited in claim 1, wherein the plurality of vacuum cups includes a first set of one or more vacuum cups with lips comprised of a first material and a second set of one or more vacuum cups with lips comprised of a second material.

6. The vacuum-based end effector as recited in claim 5, wherein the respective lips of the first set of one or more vacuum cups are comprised of a silicone rubber and the respective lips of the second set of one or more vacuum cups are comprised of polyurethane.

7. The vacuum-based end effector as recited in claim 1, and further comprising:
   one or more sensor ports, each of the one or more sensor ports being in fluid communication with a vacuum cup of the plurality of vacuum cups and configured to be operably connected to a vacuum sensor.

8. A system for engaging parcels, comprising:
   a robot; and
   an end effector mounted to the robot, the end effector including
   a base plate, a plurality of vacuum cups mounted to the base plate and configured to be placed in fluid communication with a vacuum source, each vacuum cup of the plurality of vacuum cups including a bellows having a distal end connected to a lip for engaging a parcel, and a linear actuator mounted to the base plate and including an extendible arm operably connected to at least one vacuum cup of the plurality of vacuum cups, the extendible arm being configured to extend and retract to adjust a distance between the at least one vacuum cup operably connected to the extendible arm and the base plate;

wherein the plurality of vacuum cups includes one or more vacuum cups which maintain a fixed position relative to the base plate during operation of the vacuum-based end effector, with the respective lips of the one or more vacuum cups which maintain the fixed position defining a common plane;

wherein the at least one vacuum cup operably connected to the extendible arm is positioned outside of the one or more vacuum cups maintaining the fixed position relative to the base plate when the lip of the at least one vacuum cup operably connected to the extendible arm is positioned in the common plane; and wherein the linear actuator is mounted to the base plate, such that the at least one vacuum cup operably connected to the extendible arm is positioned entirely outside of an area extending below a bottom surface of the base plate during operation of the vacuum-based end effector and is laterally spaced from the one or more vacuum cups which maintain the fixed position relative to the base plate.

9. The system as recited in claim 8, and further comprising:

a vision and control subsystem operably connected to the robot and the end effector, the vision and control subsystem including
a camera for acquiring image data corresponding to the positioning of the parcel, and
a controller operably connected to the camera and including a processor for executing instructions stored in a memory component to (i) receive and analyze image data received from the camera to identify a position of the parcel, and (ii) communicate instructions to the robot and the linear actuator which cause the robot to move the end effector towards the parcel and the linear actuator to extend the extendible arm to cause the at least one vacuum cup operably connected to the extendible arm to engage the parcel.

10. The system as recited in claim 9, and further comprising:

a sensor operably connected to the controller, the sensor being configured to acquire data corresponding to at least one of positioning of the parcel, pneumatic engagement of one or more vacuum cups of the plurality of vacuum cups with the parcel, and an amount of compression experienced by one or more vacuum cups of the plurality of vacuum cups.

11. The system as recited in claim 10, wherein the sensor includes at least one of a photoelectric sensor, an ultrasonic sensor, and a vacuum sensor.

12. The system as recited in claim 9, wherein the processor is further configured to execute instructions stored in the memory component to tilt the end effector.

13. The system as recited in claim 8, wherein the lip of the at least one vacuum cup operably connected to the extendible arm moves out of the common plane as the extendible arm is extended.

14. The system as recited in claim 8, wherein the plurality of vacuum cups includes a first set of one or more vacuum cups with lips comprised of a first material and a second set of one or more vacuum cups with lips comprised of a second material.

15. The system as recited in claim 14, wherein the respective lips of the first set of one or more vacuum cups are comprised of a silicone rubber and the respective lips of the second set of one or more vacuum cups are comprised of polyurethane.

16. The system as recited in claim 8, and further comprising:

a plurality of connectors, each connector of the plurality of connectors being in fluid communication with a vacuum cup of the plurality of vacuum cups and configured to connect to the vacuum source, wherein the base plate defines a plurality of ports, each port of the plurality of ports placing a connector of the plurality of connectors in fluid communication with a vacuum cup of the plurality of vacuum cups.

17. A vacuum-based end effector, comprising:

a base plate defining a mounting surface for connecting the vacuum-based end effector to a robot;
multiple vacuum cups, with each of the multiple vacuum cups having a proximal end mounted directly to the base plate in a fixed position, with each of the multiple vacuum cups configured to be placed in fluid communication with a vacuum source, and with each of the multiple vacuum cups including a bellows having a distal end connected to a lip for engaging a parcel;
an additional vacuum cup, which is separate and independent from each of the multiple vacuum cups, wherein the additional vacuum cup is also configured to be placed in fluid communication with the vacuum source, and wherein the additional vacuum cup also includes a bellows having a distal end connected to a lip for engaging a parcel; and
a linear actuator mounted to the base plate and including an extendible arm operably connected to the additional vacuum cup, wherein the extendible arm is configured to extend and retract the additional vacuum cup relative to the base plate.

18. A system for engaging parcels, comprising:

a robot; and
an end effector, the end effector including
a base plate mounted to the robot,
multiple vacuum cups, with each of the multiple vacuum cups having a proximal end mounted directly to the base plate in a fixed position, with each of the multiple vacuum cups configured to be placed in fluid communication with a vacuum source, and with each of the multiple vacuum cups including a bellows having a distal end connected to a lip for engaging a parcel,
an additional vacuum cup, which is separate and independent from each of the multiple vacuum cups, wherein the additional vacuum cup is also configured to be placed in fluid communication with the vacuum source, and wherein the additional vacuum cup also includes a bellows having a distal end connected to a lip for engaging a parcel, and
a linear actuator mounted to the base plate and including an extendible arm operably connected to the additional vacuum cup, wherein the extendible arm is configured to extend and retract the additional vacuum cup relative to the base plate.

19. The system as recited in claim 18, and further comprising:
a vision and control subsystem operably connected to the robot and the end effector, the vision and control subsystem including
a camera for acquiring image data corresponding to the positioning of the parcel, and
a controller operably connected to the camera and including a processor for executing instructions stored in a memory component to (i) receive and analyze image data received from the camera to identify a position of the parcel, and (ii) communicate instructions to the robot and the linear actuator which cause the robot to move the end effector towards the parcel and the linear actuator to extend the extendible arm to cause the additional vacuum cup operably connected to the extendible arm to engage the parcel.

\* \* \* \* \*